United States Patent Office 3,499,741
Patented Mar. 10, 1970

3,499,741
POUR DEPRESSANT COMPOSITION
William M. Sweeney, Wappingers Falls, N.Y., assignor to Texaco Inc., New York, N.Y., a corporation of Delaware
No Drawing. Filed Aug. 12, 1966, Ser. No. 571,970
Int. Cl. C10l 1/16
U.S. Cl. 44—62                                                 5 Claims

ABSTRACT OF THE DISCLOSURE

Pour point of middle distillate oil is improved by adding an amorphous thermally cracked ethylene-propylene-nonconjugated diene terpolymer.

---

This invention relates to a pour depressant composition, to a mineral oil composition containing same and to a method for manufacturing the pour depressant. The pour depressant is effective for substantially reducing the pour point of fuel oils, diesel oils, middle distillates and other viscous hydrocarbon oils. The pour depressant composition of the invention is also useful as an additive for gasoline wherein the composition acts as a modifier of induction system deposits.

The novel pour depressant composition of the invention comprises an amorphous, cracked, ethylene-propylene-terpolymer consisting of 10 to 90 mole percent ethylene, 5 to 70 mole percent propylene and 0.1 to 20 mole percent of a non-conjugated diene having from 5 to 30 carbon atoms, the inherent viscosity of the cracked terpolymer being in the range of 0.2 to 0.9. The process of the invention involves reacting an amorphous ethylene-propylene-terpolymer of the above olefin monomer composition having an inherent viscosity of 1.1 or above under cracking conditions to produce an amorphous cracked terpolymer product having an inherent viscosity in the range of 0.2 to 0.9.

Heating oils, diesel fuels and liquid hydrocarbon oils employed in cold climates or exposed to low temperatures frequently require the use of an additive to maintain their fluidity or to meet critical pour point specifications for the oil in question. Additives that are effective for this are called pour depressants. While the art discloses numerous pour depressants, many are not entirely suitable because of their high cost or the high concentration required or because they do not lower the pour point to the required temperature. An effective pour depressant is one which will substantially reduce the pour point of a treated oil when used in a small concentration without imparting any undesirable effects.

It has now been discovered that certain polymers which possess a moderate but unsatisfactory degree of pour depressant activity per se, can be converted to reaction products that are surprisingly effective at low concentration as pour depressants for mineral oil compositions. While the reasons for this are not fully understood it is believed that cracking of the terpolymer rearranges as well as shortens the polymers making them unexpectedly good pour depressors. This invention is directed to the novel pour depressant, to mineral oil compositions containing the pour depressant and to a method for making the pour depressant.

The pour depressant of this invention is an amorphous, cracked, ethylene-propylene-terpolymer, consisting of polymerized ethylene, propylene and a non-conjugated diene having from 5 to 30 carbon atoms in the proportions of 10 to 90 mole percent ethylene, 5 to 70 mole percent propylene and 0.1 to 20 mole percent of the diene having an inherent viscosity of from 0.2 to 0.9. Preferably, the pour depressant consists of from 50 to 90 mole percent ethylene, 5 to 45 mole percent propylene and 1 to 5 mole percent diene and has an inherent viscosity in the range of 0.3 to 0.6.

The inherent viscosity equals the natural log of the specific viscosity divided by the concentration in grams per one hundred ml. The specific viscosity for this equation is the expression of a ratio of the viscosity of the solution divided by the viscosity of the solvent (see Appendix D, p. 103, Report No. 4 in "Polymer Chemistry" by Robert Magovern, Stanford Research Institute, April 1965).

The pour depressant of the invention is prepared from an amorphous ethylene-propylene-terpolymer, consisting of ethylene, propylene and a non-conjugated diene having from 5 to 30 carbon atoms in the proportions of 10 to 90 mole percent ethylene, 5 to 70 mole percent propylene and 0.1 to 20 mole percent diene having an inherent viscosity of at least 1.1. The preferred starting terpolymer, however, is one consisting of 50 to 90 mole percent ethylene, 5 to 45 mole percent propylene and 1 to 5 mole percent of a non-conjugated diene having from 6 to 20 carbon atoms and having an inherent viscosity in the range of 1.1 to 5.

The terpolymers employed as the starting material are prepared by copolymerizing ethylene, propylene and diene in the stated proportions. The diene reactant is a non-conjugated diene having from 5 to 30 carbon atoms and preferably from 6 to 20 carbon atoms. Specific dienes which can be employed include bicyclo [2,2,1] hepta-2,5-diene, 1,4-cyclohexadiene, 1,5, cyclooctadiene, dicyclopentadiene, di-isopropenyl benzene, dipentene, 2,2-dimethyl-1,5-hexadiene, 1,5-heptadiene, 1,5-hexadiene, 2-methyl-1,4-cyclohexadiene, methyl cyclopentadiene dimer, 5-methylene-2-norbornene, 3-methyl-1,5-heptadiene, 2-methyl-1,5-hexadiene, 3-methyl-1,5-hexadiene, 1,7-octadiene, 1,4-pentadiene, 4-vinyl-1-cyclohexene, and 2-methyl-1,4-pentadiene.

The ethylene-propylene-terpolymers can be prepared by conventional polymerization methods. In general, a mixture of the ethylene, propylene and diene in a suitable solvent is polymerized under atmospheric or superatmospheric pressure in the presence of a catalyst, such as a Ziegler-Natta catalyst, to produce the amorphous terpolymer product. Terpolymers having a broad range of inherent viscosities can be so prepared by varying the concentration of the olefin components, the concentration and specific nature of the catalyst employed as well as the polymerization reaction temperature and the time of reaction.

The terpolymer of prescribed composition must be cracked to produce the effective pour depressant of the invention. The terpolymer can be cracked by any conventional cracking process although thermal cracking is preferred. Thermal cracking is accomplished by heating the terpolymer to a temperature in the range of 250 to 450° C. and holding the terpolymer at the selected temperature until the copolymer has been cracked. Generally, cracking is effected under such conditions in a period of time ranging from about 15 seconds to 10 hours although longer periods can be used. It is preferable to effect thermal cracking at a temperature from about 300 to 400° C. in a time period from about 3 to 30 minutes. Thermal cracking can be conducted in any vessel or reaction zone which can maintain the terpolymer in the noted temperature range. Alternatively, the terpolymer can be dissolved in a carrier, such as mineral oil, and the mixture treated as above to crack the terpolymer. Cracking the terpolymer in a mineral oil carrier gives a pour depressant-oil mixture which is convenient to handle and use.

The pour depressant of the invention can also be prepared by catalytically cracking the terpolymer of prescribed composition. The terpolymer is contacted with a cracking catalyst at an elevated temperature, generally in the range of 150 to 400° C. until an amorphous, cracked terpolymer having an inherent viscosity in the range of 0.2 to 0.9 is produced. Catalysts which are effective for cracking the terpolymer include the Friedel-Crafts catalysts, Fuller's earth, silica alumina, chromia alumina, molybdena, bauxite, silica magnesia and catalysts generally effective for cracking petroleum streams.

The pour depressant of the invention is employed in middle distillate mineral oils in a concentration ranging from about 0.001 to 1 weight percent. The preferred concentration of the pour depressant in an amount in the range of 0.005 to 0.05 weight percent which corresponds to about 15 to 150 ptb. (pounds per thousand barrels).

The following examples illustrate the preparation of the pour depressant of the invention and their effectiveness for lowering the pour point of the middle distillate fuel oils.

EXAMPLE I

An ethylene-propylene gas mixture in the proportion of 2.16 moles of propylene per mole of ethylene was scrubbed by passing the mixture through a packed tower in contact with 50% aqueous potassium hydroxide and thereafter dried in a tower packed with Drierite. The dry gas mixture was passed into 400 ml. of purified n-heptane to saturate the solvent which was maintained at 40° F. After saturating the solvent, the gas mixture was continuously fed into the solvent at a rate of 1.0 liters per minute. A third reactant, hexadiene-1,5 in the amount of 0.4 gram was added to the solvent containing the reaction mixture. Polymerization was initiated with catalysts. Catalyst A was a 20% solution of diethylaluminum chloride in n-heptane. Catalyst B was a 20% solution of tributylvanadate in n-heptane. ½ cc. of catalyst A and ½ cc. of catalyst B were added to the reaction mixture to initiate polymerization. After two minutes, an additional ½ cc. of catalyst B was added to the reaction mixture. The polymerization was completed after 10 min.

The terpolymer produced was recovered from the solvent by treating the mixture with several portions of methanol. The precipitated and separated terpolymer was then treated with an additional quantity of methanol to remove any remaining n-heptane and dried on a steam plate. Infrared analysis of the product established that the terpolymer was amorphous. The inherent viscosity of the ethylene-propylene-terpolymer at 0.08% in toluene at 100° F. was 1.69.

A portion of the terpolymer product was heated in a test tube at 667° F. (353° C.) for 5 minutes. This caused thermal cracking of the terpolymer material. Infrared analysis of this product showed that the cracked terpolymer was amorphous. The inherent viscosity of the cracked polymer at 0.08% in toluene at 100° F. was 0.50.

The pour depressant effect of the cracked terpolymer of the invention and of the starting terpolymer prepared above were compared by testing the additives for their pour depressant properties in a middle distillate mineral oil having the following inspection values:

Specifications for middle distillate fuel

| | |
|---|---|
| Gravity | 33.0 |
| ASTM cloud, ° F. | −2 |
| ASTM pour, ° F. | −10 |
| Flash point, ° F. | 166 |
| FIA analysis: | |
| Aromatics, % | 34.0 |
| Olefins, % | 4.5 |
| Saturates, % | 61.5 |
| ASTM distillation, °F.: | |
| IBP | 368 |
| 10 | 426 |
| 20 | 448 |
| 50 | 502 |
| 90 | 590 |
| EP | 616 |

The additive materials were used at a concentration of 100 ptb. (pounds per thousand barrels). The ethylene-propylene-terpolymer prior to cracking reduced the pour point of the middle distillate to −35° F. In contrast, the cracked terpolymer product of the invention reduced the pour point of the middle distillate to −55° F.

EXAMPLE II

An ethylene-propylene gas mixture in the proportion of 1.92 moles of propylene per mole of ethylene was scrubbed and dried as in Example I and then passed into 2000 ml. of purified n-heptane maintained at 39° F. After saturating the solvent, 2 ml. of dicyclopentadiene was added while continuously feeding the ethylene-propylene gas mixture at a rate of 2.0 liters per minute. A mixture of 2 cc. of catalyst A and 1 cc. of catalyst B, described in Example I, were added to the polymerization reaction mixture to initiate the polymerization reaction. After the reaction proceeded for three minutes, an additional 2 cc. of catalyst A was added to the reaction mixture. The reaction was completed after 18 minutes.

The terpolymer reaction product was recovered from the solvent mixture in the manner described above. Infrared analysis of the terpolymer polymerization product established that this was an amorphous terpolymer. The inherent viscosity of the terpolymer at 1% in toluene at 100° F. was 1.16 and the iodine number 8.34.

A portion of the terpolymer polymerization product was heated to 670° F. for a period of 9 minutes to thermally crack the terpolymer and produce the pour depressant of the invention. Infrared analysis of this product showed that the cracked polymer was amorphous in nature. The inherent viscosity of this product was 0.300 and the iodine number 12.9.

The pour depressant effect of the cracked terpolymer of the invention and of the starting terpolymer prepared above were compared for their pour depressant properties in a middle distillate mineral oil having a pour point of −10° F. At a concentration of 100 ptb., the terpolymer raised the pour point of the oil to 0° F. In contrast, the cracked terpolymer in the same concentration reduced the pour point of the oil to −70° F.

EXAMPLE III

An ethylene-propylene gas mixture in the proportion of 1.82 moles of propylene per mole of ethylene was scrubbed and dried as in Example I and was passed into 1000 ml. of purified n-heptane maintained at 38° F. After saturating the solvent, 2 ml. of hexadiene-1,5 was added while continuously feeding the ethylene-propylene gas mixture at a rate of 2.0 liters per minute. A mixture of 5 cc. of catalyst A and 1 cc. of catalyst B, described above, were added to the polymerization reaction mixture to initiate the polymerization reaction. After 3 minutes an additional 2 cc. of catalyst A and ½ cc. of catalyst B were added. After another minute and at 4 minute intervals thereafter for a total of 4 times, an additional one ml. of hexadiene-1,5 was added to the reaction mixture. At 6 minutes from the beginning of the reaction, an additional 2 cc. of catalyst A and ½ cc. of catalyst B were added. The reaction was completed in 30 minutes.

The terpolymer reaction product was recovered from the solvent mixture according to the method described in Example I. Infrared analysis of the terpolymer polymerization product showed that this was amorphous. The terpolymer had an inherent viscosity at 1% in toluene at 100° F. of 1.16 and an iodine number of 1.05. A portion of the terpolymer polymerization product was heated to 670° F. for a period of 9 minutes to thermally crack the terpolymer and produce the pour depressant of the invention. Infrared analysis of the cracked product showed that the cracked terpolymer was amorphous. The inherent viscosity of this product at 1% in toluene at 100° F. was 0.540.

The pour depressant effect of the cracked terpolymer of the invention and of the starting terpolymer were compared and tested for their pour depressant properties in a middle distillate mineral oil having a pour point of −10° F. At a concentration of 100 ptb., the starting terpolymer reduced the pour point of the oil to −40° F. In contrast, the cracked terpolymer reaction product in the same concentration reduced the pour point of the oil to −70° F.

In an alternate method of processing, 1000 ml. of HCl-washed polymerization reaction product in solvent (cement) containing the terpolymer was placed in a flask together with 30 gm. of a paraffinic mineral oil (flash point 435° F., kin. vis. at 210° F., 39 cs., at 100° F., 97 cs.). The mixture was stripped of heptane and the residue heated to a temperature of 680° F. and held at this temperature for 7 minutes. Analysis by dialysis showed the product to be 50 weight percent polymer. At a concentration of 100 ptb. of this 50 weight percent cracked polymer-mineral oil mixture, the pour point of the middle distillate mineral oil of the example was reduced to −50° F.

Obviously many modifications and variations of the invention, as hereinbefore set forth, may be made without departing from the spirit and scope thereof, and therefore only such limitations should be imposed as are indicated in the appended claims.

I claim:
1. A middle distillate oil composition comprising a major proportion of a mineral oil having a high pour point and a minor amount effective to substantially lower the pour point of said mineral oil of an amorphous, thermally cracked, ethylene-propylene-terpolymer pour depressant consisting of ethylene, propylene and a non-conjugated diene having from 5 to 30 carbon atoms in mole ratios of 10 to 90 percent ethylene, 5 to 70 percent propylene and 0.1 to 20 percent of said diene, said thermally cracked terpolymer having an inherent viscosity in the range of 0.2 to 0.9.

2. A middle distillate oil composition according to claim 1 in which said amorphous, cracked, ethylene-propylene-terpolymer consists of 50 to 90 mole percent ethylene, 5 to 45 mole percent propylene and 1 to 5 mole percent of said diene, said cracked terpolymer having an inherent viscosity in the range of 0.3 to 0.6.

3. A middle distillate oil composition according to claim 1 containing from 0.001 to 1 percent of said cracked ethylene-propylene-terpolymer pour depressant.

4. A middle distillate oil composition according to claim 1 in which said diene is hexadiene-1,5.

5. A middle distillate oil composition according to claim 1 in which said diene is dicyclopentadiene.

References Cited

UNITED STATES PATENTS

| | | | |
|---|---|---|---|
| 3,374,073 | 3/1968 | Gergel | 44—62 |
| 3,388,067 | 6/1968 | Takashima et al. | 44—62 |
| 3,388,977 | 6/1968 | Buckard et al. | 44—62 |

DANIEL E. WYMAN, Primary Examiner

W. CANNON, Assistant Examiner

U.S. Cl. X.R.
44—80